US012762224B2

(12) United States Patent
Tsirkin

(10) Patent No.: US 12,762,224 B2
(45) Date of Patent: Oct. 13, 2026

(54) SECURE DRIVERS FOR CONFIDENTIAL VIRTUAL MACHINES

(71) Applicant: Red Hat, Inc., Raleigh, NC (US)

(72) Inventor: Michael Tsirkin, Ra'anana (IL)

(73) Assignee: Red Hat, LLC, Raleigh, NC (US)

( * ) Notice: Subject to any disclaimer, the term of this patent is extended or adjusted under 35 U.S.C. 154(b) by 99 days.

(21) Appl. No.: 18/987,136

(22) Filed: Dec. 19, 2024

(65) Prior Publication Data

US 2026/0178725 A1 Jun. 25, 2026

(51) Int. Cl.

*G06F 21/53* (2013.01)
*G06F 21/60* (2013.01)
*G06F 21/78* (2013.01)

(52) U.S. Cl.

CPC ............ *G06F 21/53* (2013.01); *G06F 21/606* (2013.01); *G06F 21/78* (2013.01)

(58) Field of Classification Search

None

See application file for complete search history.

(56) References Cited

U.S. PATENT DOCUMENTS

2018/0095900 A1* 4/2018 Sarangdhar ......... G06F 13/1668
2019/0042299 A1* 2/2019 Neiger ................ G06F 12/1475
2021/0406054 A1* 12/2021 Tsirkin .................... G06F 21/74
2021/0406057 A1* 12/2021 Tsirkin .................... G06F 21/53
2023/0297696 A1* 9/2023 Rogers ................ G06F 9/45558 713/189
2025/0291915 A1* 9/2025 Nasim ..................... G06F 21/56
2026/0119225 A1* 4/2026 Xu ...................... G06F 9/45558

OTHER PUBLICATIONS

Xie, et al. "Introducing VDUSE: a software-defined datapath for virtio," retrieved from https://www.redhat.com/en/blog/introducing-vduse-software-defined-datapath-virtio, Jul. 14, 2022, 13 pages.

* cited by examiner

*Primary Examiner* — Chris Parry
*Assistant Examiner* — Abderrahmen Chouat
(74) *Attorney, Agent, or Firm* — Dority & Manning, P.A.

(57) ABSTRACT

Secure drivers for confidential virtual machines. A communication channel is established by a first device driver executing in a memory of a virtual machine manager (VMM) with a second device driver executing in a private memory of a user space memory of a confidential virtual machine that was initiated by the VMM. The private memory is inaccessible by the VMM. The first device driver provides the data over the communication channel to the second device driver within the user space memory. The second device driver receives the data. The second device driver modifies the private memory to include the data or prevents the data from being written to the private memory based on a criterion.

20 Claims, 9 Drawing Sheets

SECURE DRIVERS FOR CONFIDENTIAL VIRTUAL MACHINES

BACKGROUND

A confidential virtual machine (VM) can enable enhanced performance and security. For instance, confidential VMs can include inline memory encryption to secure processing of sensitive data in memory and create a hardware-enforced boundary between applications and the virtualization layer.

SUMMARY

The present disclosure is generally directed to secure drivers for confidential virtual machines.

In one implementation, a method is provided. The method includes establishing, by a first device driver executing in a memory of a virtual machine manager (VMM), a communication channel with a second device driver executing in a private memory of a user space memory of a confidential virtual machine that was initiated by the VMM, wherein the private memory is inaccessible by the VMM. The method further includes providing, by the first device driver, data over the communication channel to the second device driver within the user space memory. The method further includes receiving, by the second device driver, the data. The method further includes modifying the private memory to include the data or preventing the data from being written to the private memory, by the second device driver, based on a criterion.

In another implementation, a method is provided. The method includes establishing, by a first device driver executing in a memory of an intermediate virtual machine, a communication channel with a second device driver executing in a private memory of a user space memory of a confidential virtual machine that was initiated by the intermediate virtual machine, wherein the private memory is inaccessible by the intermediate virtual machine. The method further includes providing, by the first device driver, data over the communication channel to the second device driver within the user space memory. The method further includes receiving, by the second device driver, the data. The method further includes modifying the private memory to include the data or preventing the data from being written to the private memory, by the second device driver, based on a criterion.

In another implementation, a computing device is provided. The computing device includes a memory, and a processor device coupled to the memory. The processor device is to establish, by a first device driver executing in a memory of a virtual machine manager (VMM), a communication channel with a second device driver executing in a private memory of a user space memory of a confidential virtual machine that was initiated by the VMM, wherein the private memory is inaccessible by the VMM. The processor device is further to provide, by the first device driver, data over the communication channel to the second device driver within the user space memory. The processor device is further to receive, by the second device driver, the data. The processor device is further to modify the private memory to include the data or preventing the data from being written to the private memory, by the second device driver, based on a criterion.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
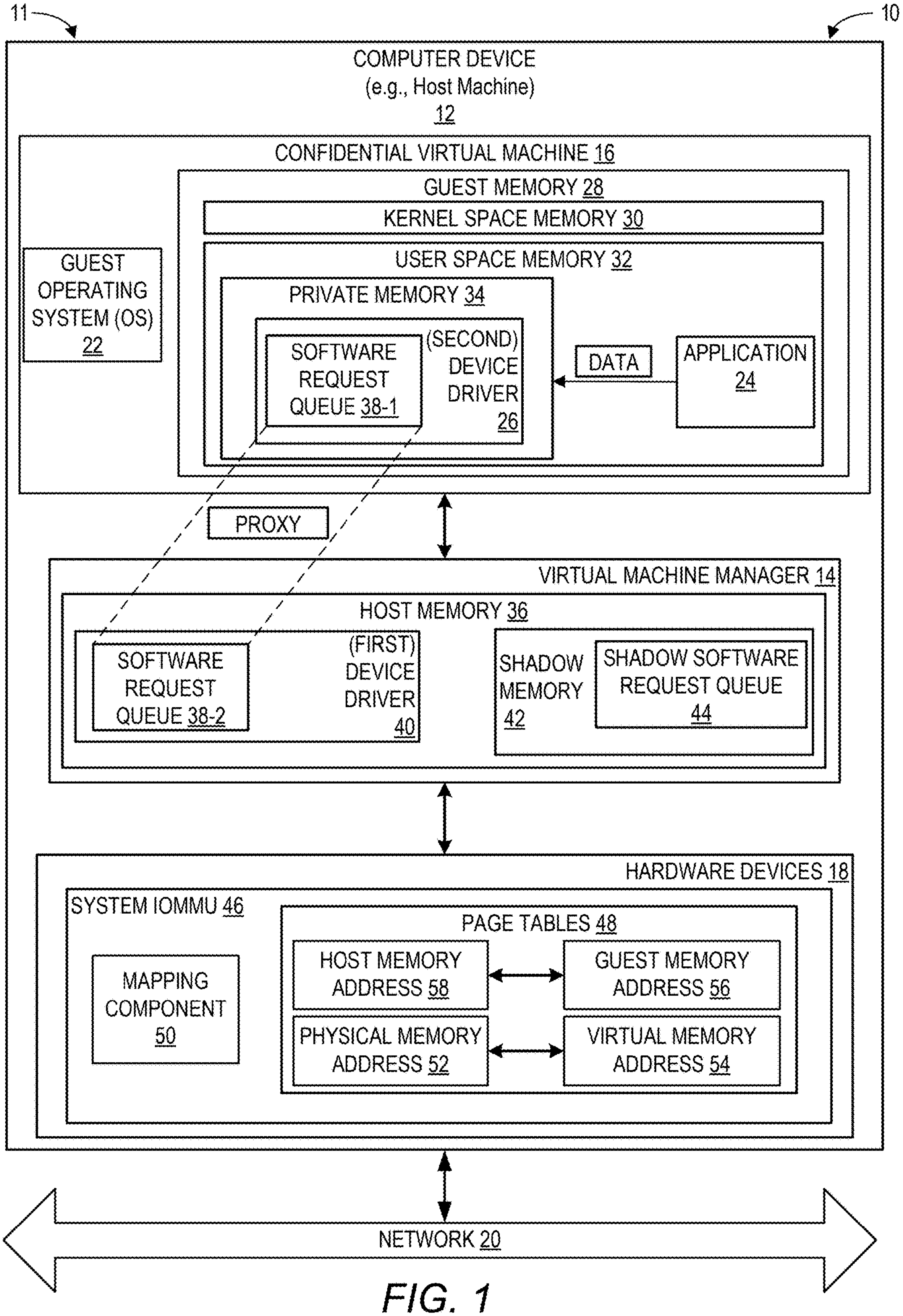
FIG. 1 is a block diagram of an environment in which secure drivers for confidential virtual machines may be implemented.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be Draw or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Confidential virtual machines (VMs) are used to increase the security posture of virtual machine systems by making VM memory "private". A confidential VM differs from a traditional virtual machine (VM) because unlike traditional VMs, the private memory of a confidential VM is inaccessible to the underlying virtualization layer typically in the form of a hypervisor (HV) or virtual machine manager (VMM). However, even confidential VMs are susceptible to security attacks. For instance, in common implementations, a VMM can modify the public memory of confidential VMs at any time. This increases the risk of a malicious VMM comprising the security of a confidential VM.

By way of example, a standard interaction between a confidential VM and a VMM can include the transfer of data. Inbound and outbound (I/O) requests for data may be passed back and forth between the VMM and the confidential VM through "shared" memory. Shared or public memory can include a portion of memory within the confidential VM that is accessible to the VMM. A virtual device driver installed within the memory of the VMM may be used to validate I/O requests between the VMM and the confidential VM.

The data may be stored in a data store such as a ring within memory of the VMM shared across the confidential VM and one or more other VMs. The data may be indexed into the ring indicating which data associated with the particular confidential VM is valid. In this example, a malicious VMM may attempt to exploit bugs in the driver to compromise the confidential VM. For instance, a malicious VMM can set an index value to a greater or lower value associated with the private memory that is outside the ring. This can cause the driver to facilitate leaking secrets or other confidential data to the VMM from the private memory because the modified index value encompasses an index within the shared memory that is accessible by the VMM.

To improve security for a confidential VM, a second device driver for the confidential VM may be configured within a user space component of the confidential VM. Additionally, another device driver may be configured within the VMM or an intermediate VM. The intermediate VM may copy the data from confidential VM to the device driver within the VMM and serve as a proxy VM. For example, the virtio data path acceleration (VDUSE) framework can be used to implement a user space device driver within the user space component of the confidential VM. The device driver within confidential VM may attach to the device driver within the VMM and process requests for data through a communication channel. For instance, a software request queue that queues requests for data within the private memory may be modified to include or exclude data. The process of including a device driver within the user space memory may cause the user space memory of the confidential VM to be stateless. A stateless process or application does not retain information about the requests or data stored within the private memory. In this case, the device driver would retain such information.

The multi-device driver architecture described herein protects the confidential VM in the event that a compromised or malicious VMM attempts to break into and leak information from the user space component of the confidential VM or otherwise compromise the integrity of the confidential VM. Furthermore, installing the device driver within the user space component of the confidential VM and utilizing the VDUSE framework allows the device driver to operate in a private memory, while also interacting with public shared memory. In this manner, any malicious system level requests will be blocked from execution.

Additional security measures such as periodically restarting the user space component of the confidential VM, blocking access to resources for the user space component by the VMM, implementing the user space component in a software VM (such as java) or a safe language such as rust may also be taken to further increase the security of the confidential VM.

FIG. 1 is a block diagram of an environment in which examples disclosed herein may be practiced. A computing environment 10 includes a computing system 11 that includes one or more computing devices 12. It should be noted that other architectures for the computing system 11 are possible, and that the implementation of a computer system utilizing embodiments of the disclosure are not necessarily limited to the specific architecture depicted. An example of an alternative implementation of the computing system 11 is further described with reference to FIG. 4.

The computing device 12 can be a single host machine or multiple host machines that may be arranged in a homogenous or non-homogenous group (e.g., cluster system, grid system, or distributed system). The computing device 12 can include a rackmount server, a workstation, a desktop computer, a notebook computer, a tablet computer, a mobile phone, a palm-sized computing device, a personal digital assistant (PDA), etc. In the implementation depicted in FIG. 1, the computing environment 10 can include a computing device 12 that includes a virtual machine manager (VMM) 14, one or more confidential virtual machine(s) (VMs) 16, and hardware devices 18 which communicate over a network 20.

The confidential VM 16 can execute guest executable code that uses an underlying emulation of the physical resources. The guest executable code can include a guest operating system 22, applications 24 (e.g., software processes), device drivers 26, etc. The confidential VM 16 can support hardware emulation, full virtualization, para-virtualization, operating system-level virtualization, and a combination thereof. The confidential VM 16 can execute the guest operating system 22 that manages a guest memory 28.

The guest memory 28 can be any virtual memory, logical memory, physical memory, other portion of memory, or a combination thereof for storing, organizing, or accessing data. Guest memory 28 can represent the portion of memory that is allocated by VMM 14 for use by the confidential VM 16. Guest memory 28 can be managed by the guest operating system 22 and can be divided into guest memory pages. In some implementations, guest memory 28 can include locations (i.e., address ranges) dedicated to storing specific types of data (e.g., software requests, data for executing software requests). For example, guest memory 28 can include a kernel space memory 30 and a user space memory 32.

The kernel space memory 30 can include a location within the guest memory 28 in which a kernel of the guest operating system 22 executes. A kernel can include, for example, one or more functions executing in a privileged mode (e.g., "kernel mode"), such as one or more functions having a highest privilege level of a plurality of privilege levels.

The user space memory 32 can include a location within the guest memory 28 in which the applications 24 that are not part of the kernel (e.g., device driver applications, user-facing applications, etc.) can execute. A user space memory 32 can allow a function having a privilege level that is lower than the highest privilege level of the plurality of privilege levels to execute.

The guest operating system 22 or confidential VM 16 can include or have access to private memory 34, which can include private memory 34 that is located in or accessible from the user space memory 32; private memory 34 that is located in or accessible from the kernel space memory 30; or private memory 34 that may be shared between the kernel space memory 30 and the user space memory 32 (e.g., responsive to one or more memory allocations controlled by a kernel of the guest operating system 22, etc.).

In some instances, the private memory 34 can include a plurality of separate memory regions, such as a plurality of user-space memory 32 regions associated respectively with the one or more user space applications 24. For example, in some instances, the application 24 (e.g., user space application) may be assigned its own memory region, which other user space applications cannot access unless explicitly allowed.

The private memory 34 can include physical or virtual memory, such as virtual memory that is mapped to physical memory associated with a host memory device 36 executing within the VMM 14 which oversees the confidential VM 16.

The private memory 34 may include one or more device drivers 26. The device drivers 26 can be a virtual device driver that allows for the simulation of physical hardware in the virtual computing environment within the confidential VM 16. For instance, the device driver 26 may control or drive the private memory device 34 by providing a software interface to the hardware such as the host memory 36 to enable the guest operating system 22 and other computer programs such as the application 24 to access hardware functions without needing to know precise details about the hardware being used. To do so, the device driver 26 may control or drive the software request queue 38-1 within the private memory 34.

The device driver 26 may be implemented within the user space memory 32 of the confidential VM 16 using the VDUSE framework. The VDUSE framework allows a software-emulated virtio data path acceleration (vDPA) device (e.g., software device 26) to be implemented in the user space memory 32 using a virtio-vDPA bus device driver to expose a virtio device. Various kernel space memory 30 subsystems may be connected to this virtio device to allow for access by the application 24 within the user space memory 32.

For example, to enable a user space VDUSE daemon to access a data buffer in the virtio device driver, a memory management unit (MMU)-based software input/output translation lookaside buffer (IOTLB) with a bounce-buffering mechanism may be introduced in a VDUSE kernel module for the data plane within the kernel space memory 30. Data associated with the device driver 26 may be copied from the original data buffer in the kernel space memory 30 to the bounce buffer and back, depending on the direction of the transfer. This allows the user space daemon to map the bounce buffer to its address space instead of the original address space to expose the device driver 26 within the user space memory 32.

The software request queue 38-1 can include one or more requests to interact with data that is generated by a software process of the confidential virtual machine 16, such as the application 24, that are waiting to be executed. For instance, the application 24 may initiate one or more requests to store or otherwise interact with data stored within the private memory 34. Data stored in the private memory 34 may include sensitive data such as, but not limited to, configuration variables, secrets, or other confidential data.

In the same or other implementations, the guest memory 38 can include a device data buffer within which data used for executing software requests can reside. For instance, because the VMM 14 may allocate guest memory 28 to the confidential VM 16, the VMM 14 may have access to the guest memory 28, but due to an index range defined by the confidential virtual machine may not have access to the private memory 34 unless explicitly granted. However, a malicious VMM 14 may attempt to gain access to the private memory 34 by adjusting of modifying the index range of the private memory 34 causing the private memory 34 to be accessible to the shared host memory 36 in a similar manner to the guest memory 28.

The host memory 36 (e.g., hypervisor memory) can be the same or similar to the guest memory 28. The host memory 36 can include host pages, the state of each of which can be different. For example, the host pages can each be in a particular state including an unallocated memory state, a state of being allocated to guests such as the guest memory 28, and a state of being allocated to the VMM 14. In an embodiment, the host memory 36 may allocate memory to an intermediate VM. An example of an intermediate VM is further described with reference to FIG. 4.

The unallocated memory can be one or more host memory pages that have not yet been allocated or that were previously allocated by the VMM 14 and have since been deallocated (e.g., freed) by the VMM 14. The memory allocated to guest memory 28 can be a portion of host memory 36 that has been allocated by the VMM 14 to the confidential VM 16, intermediate VM, etc., and can correspond to the guest memory 28. For example, host memory 36 can include the guest memory 28 and a software request queue 38-2. In an example, the software request queue 38-2 can duplicate, copy, or remap the software request queue 38-1 of the guest memory 28 to the software request queue 38-2 and maintain consistency between them such that the same software requests are present in each queue.

Similar to the private memory 34, the host memory 36 can include a device driver 40. The device drivers 40 can include similar properties as the device driver 26 and may control or drive the host memory device 34 by providing a software interface to the hardware such as the hardware devices 18. To do so, the device driver 40 may control or drive the software request queue 38-2 within the host memory 36. For example, the first device driver 40 and the second device driver 26 may each initiate a communication channel with each other to proxy the requests within the respective software request queue 38-1, 38-2 to each other.

The communication channel can include communication using one or more communication protocols through one or more interfaces of the first device driver 40 or the second device driver 26. A non-limiting example of a communication protocol includes the network driver interface specification (NDIS). NDIS includes a specification for how communication protocol programs (such as TCP/IP) and network device drivers communicate with each other.

Proxying the requests using the first device driver 40 and the second device driver 26 may include authorizing the first device driver 40 to transmit or receive requests for data to the confidential VM 16 on behalf of the host memory 36 of the VMM 14 and authorizing the second device driver 26 to receive or transmit requests to interact with data on behalf of the confidential VM 16. In this manner, the first device driver 40 and second device driver 26 may operate to inhibit or allow modifications, access, or other interactions with data stored in the private memory 34 of the confidential VM 16.

Other portions of the host memory 36 can be allocated for use by VMM 14, a host operating system, hardware device, other module, or a combination thereof. These other portions of host memory 36 can be exclusively accessible by the VMM 14 or the host system 11 and can be configured to be inaccessible to the confidential VM 16. In some implementations, host memory 36 can include a shadow memory buffer 42 that is inaccessible to the confidential VM 16. The shadow memory buffer 42 can include a shadow software request queue 44. In the same or other implementations, the VMM 14 can duplicate, copy, or remap software request queue 38-2 of the guest memory 28 to the shadow software request queue 44 and maintain consistency between each such that the same software requests are present in each queue.

VMM 14 can provide the confidential VM 16 with access to one or more features of the underlying hardware devices 18. In the depicted implementations, VMM 14 can run directly on the hardware of the computer system 11 (e.g., bare metal hypervisor). In other examples, VMM 14 can run on or within a host operating system (not shown). The VMM 14 can manage system resources, including access to the hardware devices 18. In the example shown, the VMM 14 can include a configuration component (not shown).

The hardware devices 18 can provide hardware resources and functionality for performing computing tasks described herein. The hardware devices 18 can include one or more physical storage devices (not shown), one or more physical processing devices (not shown), the system IOMMU 46, other computing devices, or a combination thereof. One or more of the hardware devices 18 can be divided into multiple separate devices or consolidated into one or more hardware devices. Some of the hardware device shown can be absent from hardware devices 18 and can instead be partially or completely emulated by executable code.

The physical storage devices of the hardware devices 18 can include any data storage device that is capable of storing digital data and can include volatile or non-volatile data storage. Volatile data storage (e.g., non-persistent storage) can store data for any duration of time but can lose the data after a power cycle or loss of power. Non-volatile data storage (e.g., persistent storage) can store data for any duration of time and can retain the data beyond a power cycle or loss of power. In one example, physical storage devices can be physical memory and can include volatile memory devices (e.g., random access memory (RAM)), non-volatile memory devices (e.g., flash memory, NVRAM), and/or other types of memory devices. In another example, physical storage devices can include one or more mass storage devices, such as hard drives, solid state drives (SSD)), other data storage devices, or a combination thereof. In a further example, physical storage devices can include a combination of one or more memory devices, one or more mass storage devices, other data storage devices, or a combination thereof, which can be arranged in a cache hierarchy with multiple levels.

The physical processing devices can include one or more processors that are capable of executing the computing tasks. Physical processing devices can be a single core processor that is capable of executing one instruction at a time (e.g., single pipeline of instructions) or can be a multi-core processor that simultaneously executes multiple instructions. The instructions can encode arithmetic, logical, or I/O operations. In one example, physical processing devices can be implemented as a single integrated circuit, two or more integrated circuits, or can be a component of a multi-chip module (e.g., in which individual microprocessor dies are included in a single integrated circuit package and hence share a single socket). A physical processing device can also be referred to as a central processing unit ("CPU").

The configuration component can execute configuration operations on the host system IOMMU 46 (also referred to as "host IOMMU"). In some implementations, configuration component can allocate memory to confidential VM 16, configure host memory 36, and configure memory access restrictions. In some examples, configuration component can set permissions and access parameters to permit access to the guest memory 28 and host memory 36. For example, the configuration component of the VMM 14 can assign one or more process address space IDs (PASIDs) to a peripheral device (not shown) for use when performing operations that involve accessing the host memory 36 and accessing the guest memory 28, respectively. In the same or other implementations, configuration component can configure the system IOMMU 46 to translate memory access requests associated with the confidential virtual machine 16, peripheral devices, etc., and to store the translations in IOMMU page tables 48.

The system IOMMU 46 can manage address translations in response to receiving memory access requests, interrupt requests, or any other data requests and/or commands. System IOMMU 46 can include page table(s) 48 and a mapping component 50. The page table(s) 48 can each be a data structure used to store (e.g., as one or more page table entries) a mapping of one memory address type to another memory address type (e.g., addresses of the guest memory 28 to addresses of the host memory 36, physical addresses to virtual addresses, etc.). In some implementations, page tables 48 can include page table entries respectively associated with a corresponding PASID (e.g., PASID1, PASID2, etc.) assigned by the configuration component or the mapping component 50. In other implementations, page tables 48 can include page table entries that are not associated with any PASID.

Accordingly, address translation or identification can be managed using the page table(s) 48. For example, page table(s) 48 can be used by the system IOMMU 46 to identify the physical address 52 mapped (e.g., corresponding) to a virtual memory address 54. In another example, page table(s) 48 can be used by the system IOMMU 46 to identify the guest physical addresses 56 of guest memory 28 pages that is mapped to a corresponding host physical addresses 58 of host memory 36. The page table 48 can include one or more page tables such as a protected page table or an unprotected page table.

In some implementations, the host page table(s) 48 can be extended page tables (EPTs) mapping guest physical addresses to host physical addresses. In the same or other implementations, the page tables 48 can be the shadow page tables mapping the guest virtual addresses to host physical addresses. In some implementations, page table(s) 48 can be the VMM page tables, mapping the guest physical addresses to hypervisor virtual addresses.

Network 20 can be a public network (e.g., the internet), a private network (e.g., a local area network (LAN), a wide area network (WAN)), or a combination thereof. In some implementations, network 20 can include a wired or a wireless infrastructure, which can be provided by one or more wireless communications systems, such as a wireless fidelity (Wi-Fi) hotspot connected with the network 20 and/or a wireless carrier system that can be implemented using various data processing equipment, communication towers, etc.

With this background, an example of implementing secure drivers for confidential VMs will be discussed. Assume that the VMM 14 has been compromised due to a cyberattack. An example cyberattack can include a complex attack such as SPECTRE or Meltdown. The example cyber attack may exploit vulnerabilities within the hardware devices 18 and allow external software programs to steal data that is being processed or stored on the computing device 12. For instance, while software programs are typically not permitted to read data from the application 24, a malicious program can exploit Meltdown and Spectre to get access to data such as secrets stored in the private memory 34 of the confidential virtual machine 16. This might include passwords, personal photos, emails, instant messages and even business-critical documents.

In order to decrease the risk of the cyber attack being successful, the first device 40 may be configured to execute within the host memory 36 of the VMM 14 and the second device driver 26 may be configured via to execute within the private memory 34 of the user space memory 32 of the confidential VM 16.

The malicious VMM 14 may cause the first device driver 40 to establish a communication channel with the second device driver 26 to provide data associated with one or more requests within the software request queue 38-1. The data may be intended to modify an index or address range associated with the private memory, read data directly, or otherwise cause the confidential VM 16 to expose sensitive data within the private memory 34. For instance, the first device driver 40 may transmit data associated with a request that when queued and executed within the request queue 38-1, causes the private memory to leak sensitive data.

However, the second device driver 26 may receive the data and based on a criterion, allow the data to modify the private memory 34 by queuing the request associated with the data within the request queue 38-1 or preventing the data from being written to the private memory preventing the request associated with the data from being queued.

For instance, the second device driver 26 may be configured with a first criterion to detect and reject all requests from the host memory 36 to interact, modify, or read data from the private memory 34. In another example, the second device driver 26 may be configured with a second criterion that allows the host memory 36 to copy specific data from the private memory 34. One of ordinary skill will appreciate that the first device driver 40 and the second device driver 26 may be configured to any set of criterion that allow or inhibit any combination of data access and modification controls which may be tailored to the specific needs of a variety of use cases.

Accordingly, the multi-device driver architecture may increase the security of the confidential VM 16 by introducing a second device driver 40 that must also be exploited by any cyberattack in order to compromise the security of the confidential VM 16.

Additionally, or alternatively, further security measures may also be taken to further increase the security of the confidential VM 16. For instance, a periodic restart of the user space memory 32 may disrupt an on-going cyberattack to compromise the second device driver 40 causing the malicious software to also restart the attack. In another example, an additional security measure may include a complete access block by the VMM 14 to resources utilized by the user space memory 32 may prevent any requests from executing system level calls. In yet another example, an additional security measure may include configuring the system IMMOU 46 to block the user space memory from corrupting the host memory 36 of the VMM 14. For instance, in the event of a denial of service (DoS) cyberattack, a malicious VMM 16 can corrupt the host memory 36, part of which is allocated to the guest memory 28 causing a DoS attack. While this attack may cause a disruption, it would be unsuccessful in exploiting the private memory 34.

Figure 2:
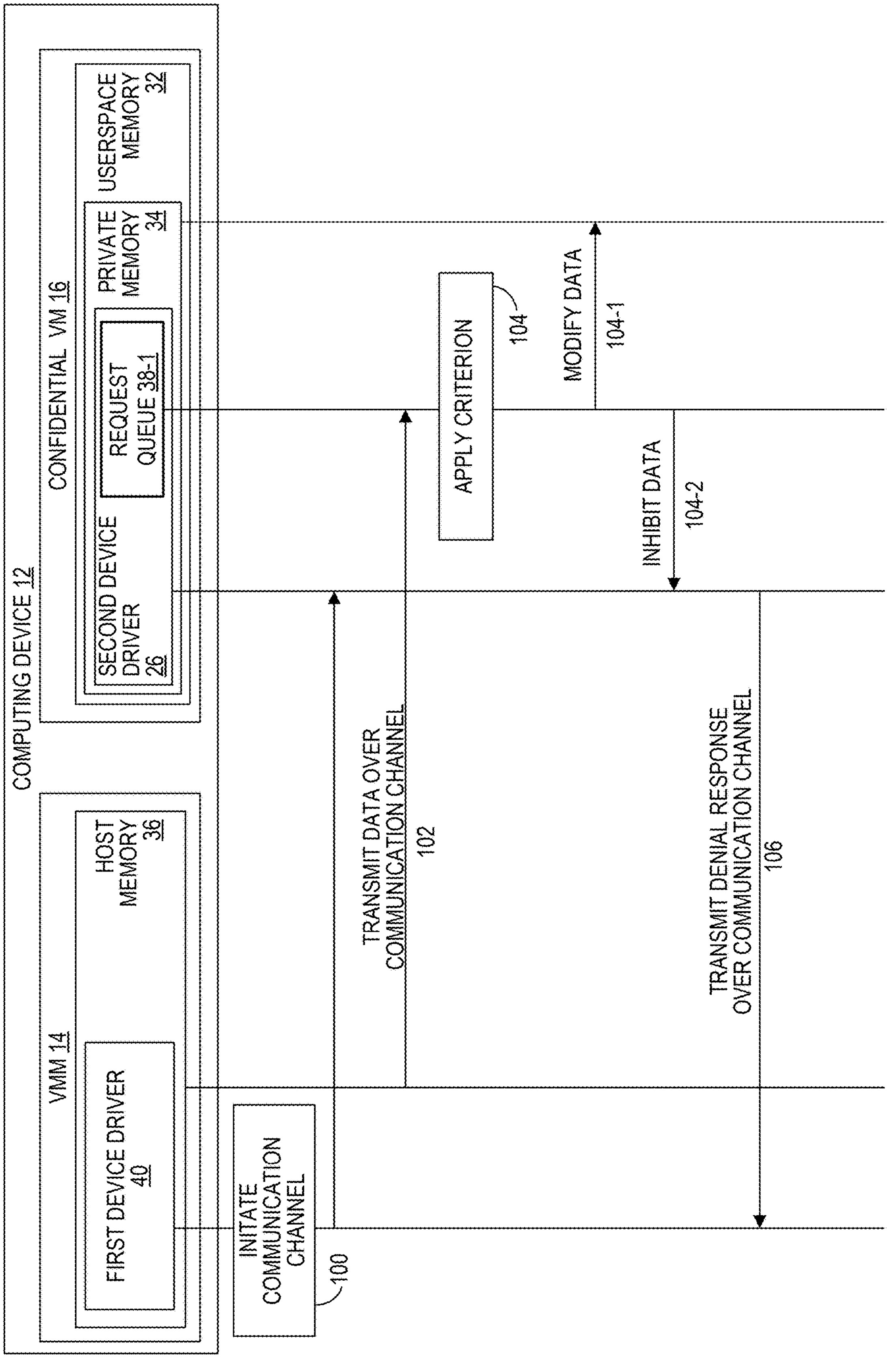
FIG. 2 is a sequence flow diagram illustrating actions taken and messages exchanged between certain components illustrated in FIG. 1 according to one implementation of secure drivers for confidential virtual machines.

FIG. 2 is a sequence flow diagram illustrating actions taken and messages exchanged between certain components illustrated in FIG. 1 for implementing secure drivers for confidential VMs according to one implementation. Although FIG. 2 depict steps in a particular order for purposes of illustration and discussion, the present disclosure is not limited to the particular illustrated order or arrangement. For example, various steps can be omitted, added, rearranged, or otherwise modified without deviating from the scope of the present disclosure.

Assuming that the VMM 14 is malicious or is executing malicious software, the first device driver 40 may be compromised and initiate a communication channel with the second device driver 26 (FIG. 2, step 100). The communication channel may allow the malicious VMM 14 to interact with and attempt to leak data from the private memory 34 of the confidential VM 16. For example, the first device driver 40 may initiate a communication channel for the purpose of transferring data via the first device driver 40 that, once received, modifies the index range for storage locations of the private memory 34 of confidential VM 16 causing the private memory 34 to become accessible. The first device driver 40 may be executing within the host memory 36 of the VMM 14 and the second device driver 26 may be executing within the private memory 34 of the user space memory 32 of the confidential VM 16 to facilitate the transfer of the data.

Once the communication channel has been established, the first device driver 40 can provide over the communication channel the data to the second device driver 26 (FIG. 2, step 102). For example, the second device driver 26 may receive the data and determine whether the data or request associated with the data should be allowed to modify the index range of the private memory 34 or inhibited using a criterion.

By way of example, the second device driver 26 may serve as a proxy for the request queue 38-1 which authorizes interactions such as additions, modifications, etc., to the request queue 38-1. The data received by the second device driver 26 may include a request, that once executed within the request queue 38-1 causes the index range of the private memory 34 to be modified. Accordingly, the second device driver 26 may apply one or more criterion 104 to the request queue 38-1 (FIG. 2, step 104). The criterion may include a set of rules, parameters, or defined security protocols that when, compared to the data or the request associated with the data, is configured to filter or otherwise control types of requests, data, or modifications that may be allowed within the private memory 34. The criterion may include a set of security parameters that increase or decrease in hardware-based isolation between the confidential VM 16 and the VMM 14 including but not limited to periodically restarting the user space memory 32 of the confidential VM 16, blocking access to resources for the user space memory 32 by the VMM 14, implementing the user space memory 32 in a software VM (such as java) or a safe language such as rust, etc. In the event that the data or request satisfies the criterion, the second device driver 26 may allow the data within the private memory 34 to be modified (FIG. 2, step 104-1).

Assuming that the malicious VM 14 has transmitted data that modifies the index value of the private memory 34 to cause the private memory 34 to leak sensitive data, criterion will not be satisfied and the second device driver 26 may inhibit the data modification by preventing the data or a request associated with the data from being queued for execution within the requests queue 38-1 (FIG. 2, step 104-2). In response to rejecting or inhibiting the data, the second device driver 26 can transmit over the communication channel a request response denying the modification to the index values associated with the private memory 34 of the confidential virtual machine 16. (FIG. 2, step 106). The denial response can be received by the first device driver and terminate the cyberattack.

Figure 3:
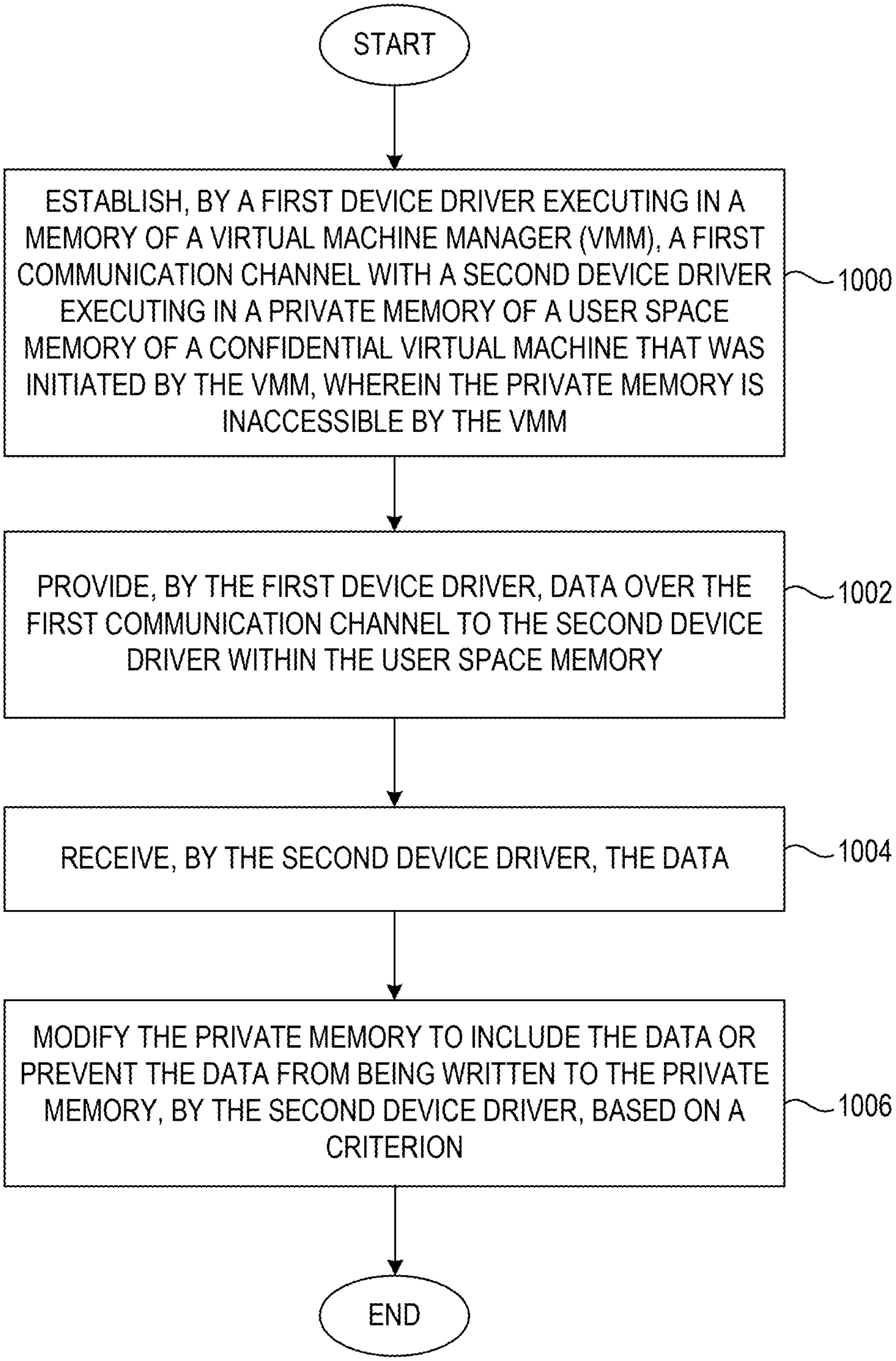
FIG. 3 a flowchart diagram of a method for implementing secure drivers for confidential virtual machines according to one implementation.

FIG. 3 is a flowchart of a method for implementing secure drivers for confidential VMs according to one implementation. Although FIG. 3 depicts steps in a particular order for purposes of illustration and discussion, the present disclosure is not limited to the particularly illustrated order or arrangement. For example, various steps can be omitted, added, rearranged, or otherwise modified without deviating from the scope of the present disclosure.

The first device driver 40 executing in the host memory 36 of the VMM 16 establishes a communication channel with the second device driver 26 executing in the private memory 34 of the user space memory 32 of the confidential VM 16 that is inaccessible by the VMM 14. The private memory (FIG. 3, block 1000). The first device driver 40 provides the data over the communication channel to the second device driver 26 within the user space memory 32 (FIG. 3, block 1002). The second device driver 26 receives the data (FIG. 3, block 1004). The second device driver 26 determines whether to modify the private memory 34 to include the data or prevent the data from being written to the private memory 34 based on a criterion. (FIG. 3, block 1006).

Figure 4:
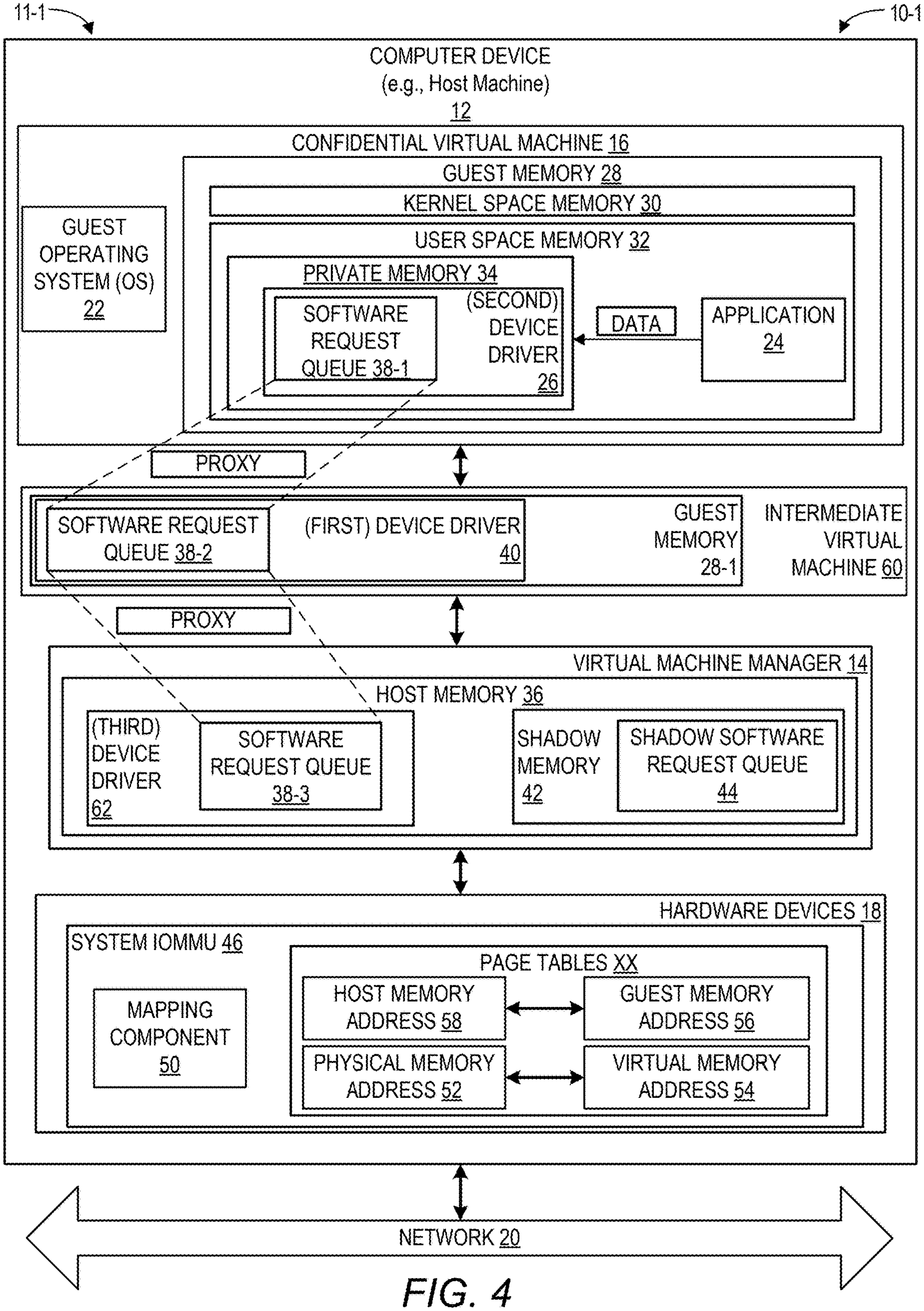
FIG. 4 is a block diagram of an environment in which secure drivers for confidential virtual machines may be implemented.

FIG. 4 is a block diagram of an environment in which examples disclosed herein may be practiced. The computing environment 10-1 includes a computing system 11-1 that includes one or more computing devices 12. The computing environment 10-1, computing system 11-1 may include similar properties to the computing environment 10 and computing system 11 of FIG. 1. For instance, the computing environment 10-1 and computing system 11-1 may be an alternative implementation of the computing environment 10 and the computing system 11. It should be noted that other architectures for the computing system 1-11 are possible, and that the implementation of a computer system utilizing embodiments of the disclosure are not necessarily limited to the specific architecture depicted.

The computing device 12 may be the same computing device 12 as depicted in FIG. 1 and include similar components such as the confidential virtual machine 16, the VMM 14, the hardware devices 18, the network 20, and all subsystems and components described therein. In this implementation, the computing device 12 may include an intermediate VM 60 positioned in between the confidential VM 16 and the VMM 14. The intermediate VM 60 may increase the security of the confidential VM 16 by introducing another device driver within the computing device 12 causing any cyberattack to compromise three device drivers instead of two.

The intermediate VM 60 may include similar properties to the confidential VM 16. For instance, the intermediate VM 60 can execute guest executable code which uses an underlying emulation of the physical resources. The intermediate VM 60 can include a guest operating system (not shown), applications (e.g., software processes)(not shown), device drivers, etc. The intermediate VM 60 can include a guest memory 28-1. The guest memory 28-1 can include similar properties to the guest memory 28 of the confidential VM 16. The intermediate VM 60 can support hardware emulation, full virtualization, para-virtualization, operating system-level virtualization, and a combination thereof. For brevity, some of the components of the intermediate VM have been omitted and are not shown in FIG. 4. One of ordinary skill will appreciate that the intermediate VM 60 may be a confidential intermediate VM or a traditional VM which utilizes computing resources, memory resources, etc., that are allocated by the VMM 14.

In this implementation, the first device driver 40 may be executing with the intermediate VM 60. For instance, the first device driver 40 may be executing within a guest memory 28-1 of the intermediate VM 60. The first device driver 40 may be executed in public (e.g. shared) or private memory of the intermediate VM 60. Accordingly, the first device driver 40 may control or drive a guest memory device of the intermediate VM 60 by providing a software interface to the VMM 14 and the confidential VM 16. To do so, the device driver 40 may control or drive the software request queue 38-2 within the guest memory 36 of the intermediate VM 60. Similar to the implementation described in FIG. 1, the first device driver 40 and the second device driver 26 may each initiate a communication channel with each other to proxy data and/or requests associated with data within the respective software request queue 38-1, 38-2 to each other.

In this implementation, the VMM 14 may include a third device driver 62. The third device driver 62 can include similar properties as the first device driver 40 and the second device driver 26 and may control or drive the host memory device 36 by providing a software interface to the hardware such as the hardware devices 18 and the first device driver 40. Accordingly, the third device driver 62 may control or drive the software request queue 38-3 within the host memory 36. For example, the third device driver 62 and the first device driver 40 may each initiate a communication channel with each other to proxy the requests within the respective software request queue 38-3, 38-2 to each other.

With this background, an example of implementing secure drivers for confidential VMs using an intermediate VM will be discussed. Similar to FIG. 1, assume that the VMM 14 has been compromised due to a cyberattack. The cyberattack can include an attempt to exploit speculative execution by the computing device 12. Speculative execution can include low-level software code such as kernel code where the CPU tries to guess what code needs to be executed next, and then performs that code before being required to do so. If the executed code turns out not to be needed, the changes are reverted which is meant to save time and speed up performance. However, speculative execution may be exploited by a malicious VMM 14 by performing speculative execution of code via the software request queue 38-1 without requiring important security checks.

In order to decrease the risk of the cyberattack being successful by performing speculative execution of malicious code provided by the malicious VMM 12 to compromise the confidential VM 16, the first device driver 40 may be configured to execute within the guest memory 28-1 of the intermediate VM. For instance, the malicious VMM 14 may cause the third device driver to establish and initiate a communication channel with the first device driver 40 to provide data including malicious kernel code for the purpose of being queued within the software request queue 38-1 for speculative execution within the confidential VM 16.

However, the positioning of the intermediate VM 60 between the VMM 14 and the confidential VM 16 prevents the malicious VMM 14 from having direct communications with the confidential VM 16 and causes the cyberattack to first exploit the third software driver executing within the host memory 36 of the VMM, then the first device driver 40 executing with the guest memory 28-1 of the intermediate VM 60, and lastly the second device driver 26 within the private memory 34 of the users pace memory 32 within the confidential VM 16 to be successful. In an embodiment, the first device driver 40 may be configured with criterion which prevents speculative execution, detects malicious kernel code, etc. Accordingly, the first device driver 40 may serve as a first line of defense in preventing the malicious VMM 14 from accessing the private memory 34 of the confidential VM 16.

Assuming that the first device driver 40 is also compromised due to the cyberattack and the data including the malicious kernel code is provided to the intermediate VM 60, the first device driver 40 queue the malicious kernel code within the request queue 38-2. Similar to FIG. 1, the request queue 38-1 can duplicate, copy, or remap the software request queue 38-2 of the guest memory 28-1 of the intermediate VM 60 to the software request queue 38-2 and maintain consistency between them such that the same software requests are present in each queue.

Accordingly, the first device driver 40 may establish and initiate a communication channel with the second device driver 26 to attempt to provide data including the malicious kernel code to the second device driver 26 for the purpose of being queued within the software request queue 38-1 for speculative execution within the confidential VM 16.

However, the second device driver 26 may receive the data and based on a second criterion, allow or prevent the data from being written to the private memory (e.g., queued within the request queue 38-1. In an embodiment, the second criterion may include additional or different criterion from the criterion applied by the first device driver 40. For instance, the second criterion may be configured to reject any data received from the VMM 14 in addition to disabling speculative execution within the confidential VM 16. Moreover, the further security measures discussed in FIG. 1 may also be applied as a second criterion to further increase the security of the confidential VM 16. One of ordinary skill will appreciate that the first device driver 40, second device driver 26, and third device driver 62 may be configured to a set of criterion that allow or inhibit any combination of data access and modification controls which may be tailored to the specific needs of a variety of use cases.

Figure 5:
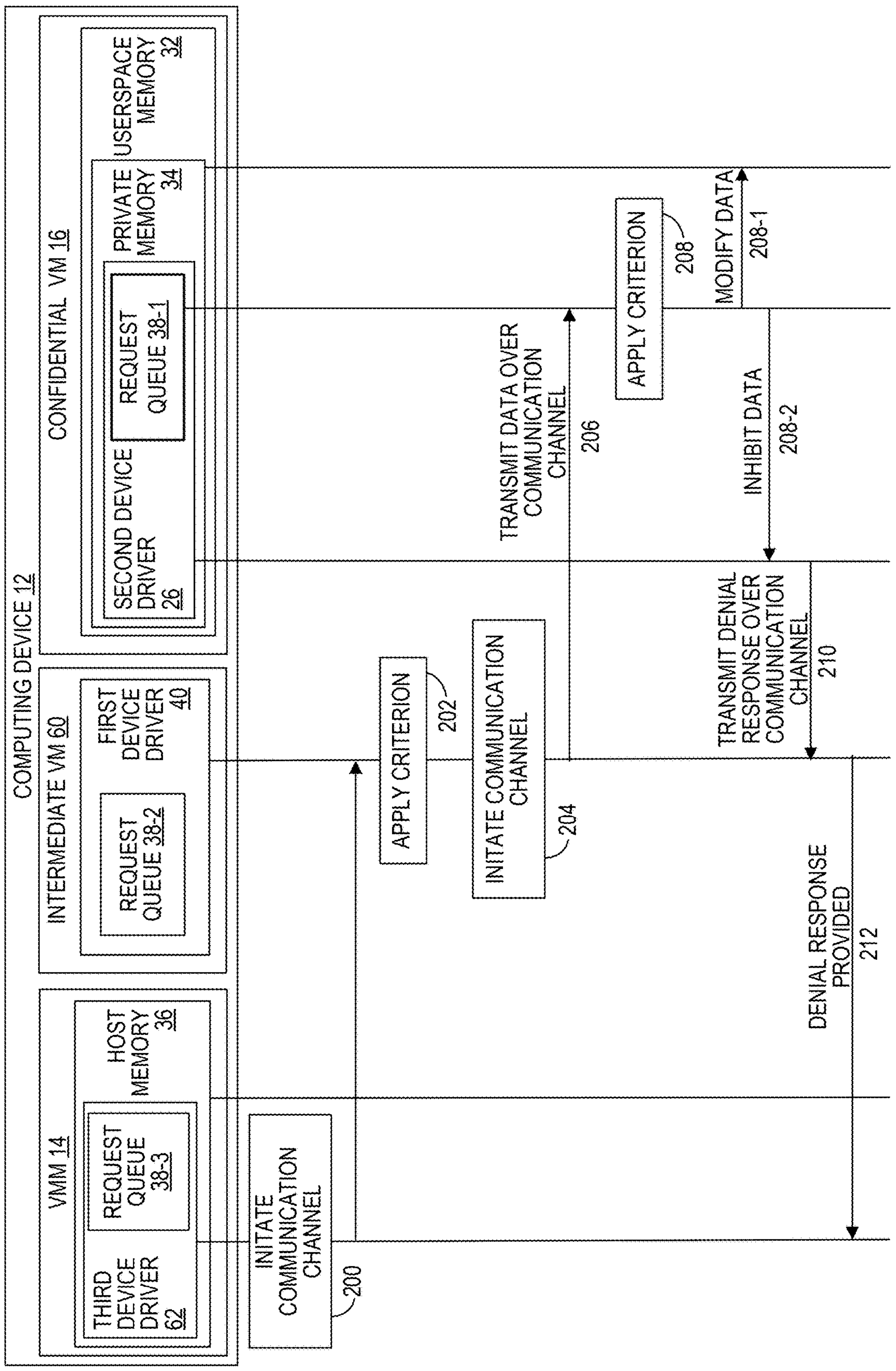
FIG. 5 is a sequence flow diagram illustrating actions taken and messages exchanged between certain components illustrated in FIG. 4 according to one implementation of secure drivers for confidential virtual machines.

FIG. 5 is a sequence flow diagram illustrating actions taken and messages exchanged between certain components illustrated in FIG. 4 for implementing secure drivers for confidential VMs using an intermediate VM according to one implementation. Although FIG. 5 depict steps in a particular order for purposes of illustration and discussion, the present disclosure is not limited to the particular illustrated order or arrangement. For example, various steps can be omitted, added, rearranged, or otherwise modified without deviating from the scope of the present disclosure.

Assuming that the VMM 14 is malicious or is executing malicious software, the third device driver 62 may be compromised and attempt to cause the confidential VM 16 to execute malicious code. For instance, the third device driver 62 may queue the data including the malicious code within the software request queue 38-3 and establish a communication channel with the first device driver 40 to attempt to provide the data to the software request queue 38-2 of the intermediate VM 60 (FIG. 5, step 200). The communication channel may allow the malicious VMM 14 to interact with and attempt to cause the intermediate VM 60 to compromise the confidential VM 16 by subsequently providing the data including the malicious code to the software request queue 38-1 within the private memory 34 of the confidential VM 16.

For example, the first device driver 40 may receive the data and apply a first criterion (FIG. 5, step 202). The first criterion may cause the first device driver 40 to reject the data and prevent the data from being written to the request queue 38-2 within the intermediate VM 60. However, assuming that the first device driver 40 has also been compromised by the cyberattack or cyberattack is successful in evading the first criterion, the first device driver 40 may initiate a communication channel with the second device driver 26 for the purpose of transmitting the data including the malicious code to the confidential VM 16. (FIG. 5, step 204).

Once the communication channel has been established, the first device driver 40 can provide over the communication channel the data to the second device driver 26 (FIG. 5, step 206). For example, the second device driver 26 may receive the data and determine whether the data or request associated with the data should be allowed to modify the index range of the private memory 34 or inhibited using a second criterion.

By way of example, the second device driver 26 may serve as a proxy for the request queue 38-1 which authorizes interactions such as additions, modifications, etc., to the request queue 38-1. Accordingly, the second device driver 26 may apply the second criterion to the request queue 38-1 (FIG. 5, step 208). The second criterion may include a set of rules, parameters, or defined security protocols that when compared to the data including the malicious code is configured to filter or otherwise control types of requests queued within the request queue 38-1 within the private memory 34. In the event that the data including the malicious code satisfies the second criterion, the second device driver 26 may allow the data within the private memory 34 to be modified (FIG. 5, step 208-1).

However, due to the malicious nature of the code within the date, the second device driver 26 may apply the second criterion and inhibit the malicious code from executing within the confidential VM 16 by preventing the data from being queued for execution within the requests queue 38-1 (FIG. 5, step 208-2). In response to rejecting or inhibiting the data, the second device driver 26 can transmit over the communication channel a request response denying the data from being queued within the request queue 38-1 with the private memory 34 of the confidential virtual machine 16. (FIG. 5, step 210). The denial response can be received by the first device driver and transmitted back to the malicious third device driver 62 within the VMM 14 to terminate the cyberattack (FIG. 5, step 212).

Figure 6:
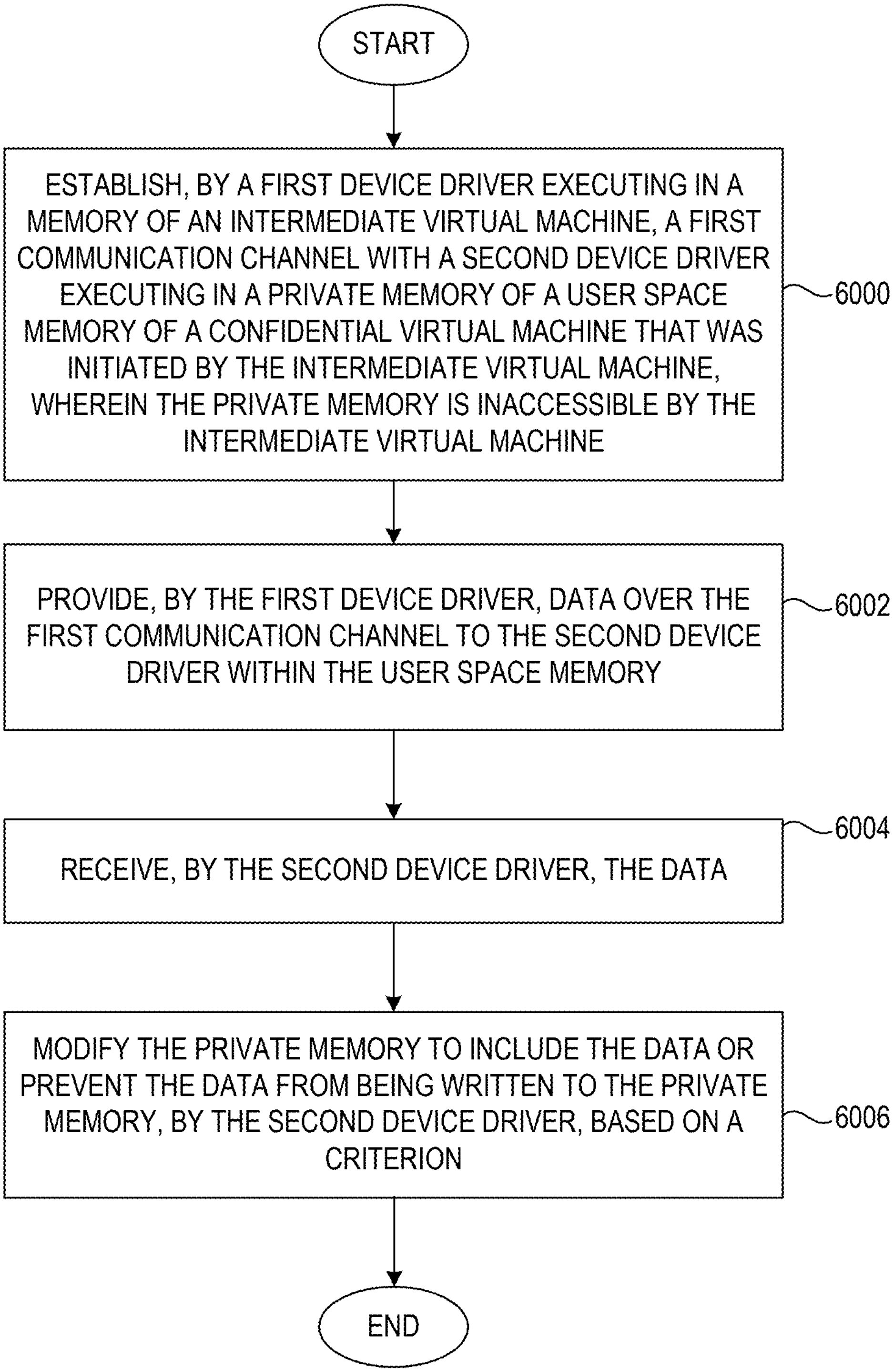
FIG. 6 is a flowchart diagram of a method for implementing secure drivers for confidential virtual machines according to one implementation.

FIG. 6 is a flowchart of a method for implementing secure drivers for confidential VMs using an intermediate VM according to one implementation. Although FIG. 6 depicts steps in a particular order for purposes of illustration and discussion, the present disclosure is not limited to the particularly illustrated order or arrangement. For example, various steps can be omitted, added, rearranged, or otherwise modified without deviating from the scope of the present disclosure.

The first device driver 40 executing in the guest memory 28-1 of the intermediate VMM 16 establishes a communication channel with the second device driver 26 executing in the private memory 34 of the user space memory 32 of the confidential VM 16 that is inaccessible by the VMM 14. (FIG. 6, block 6000). The first device driver 40 provides the data over the communication channel to the second device driver 26 within the user space memory 32 (FIG. 6, block 6002). The second device driver 26 receives the data (FIG. 6, block 6004). The second device driver 26 determines whether to modify the private memory 34 to include the data or prevent the data from being written to the private memory 34 based on a criterion. (FIG. 6, block 6006).

Figure 7:
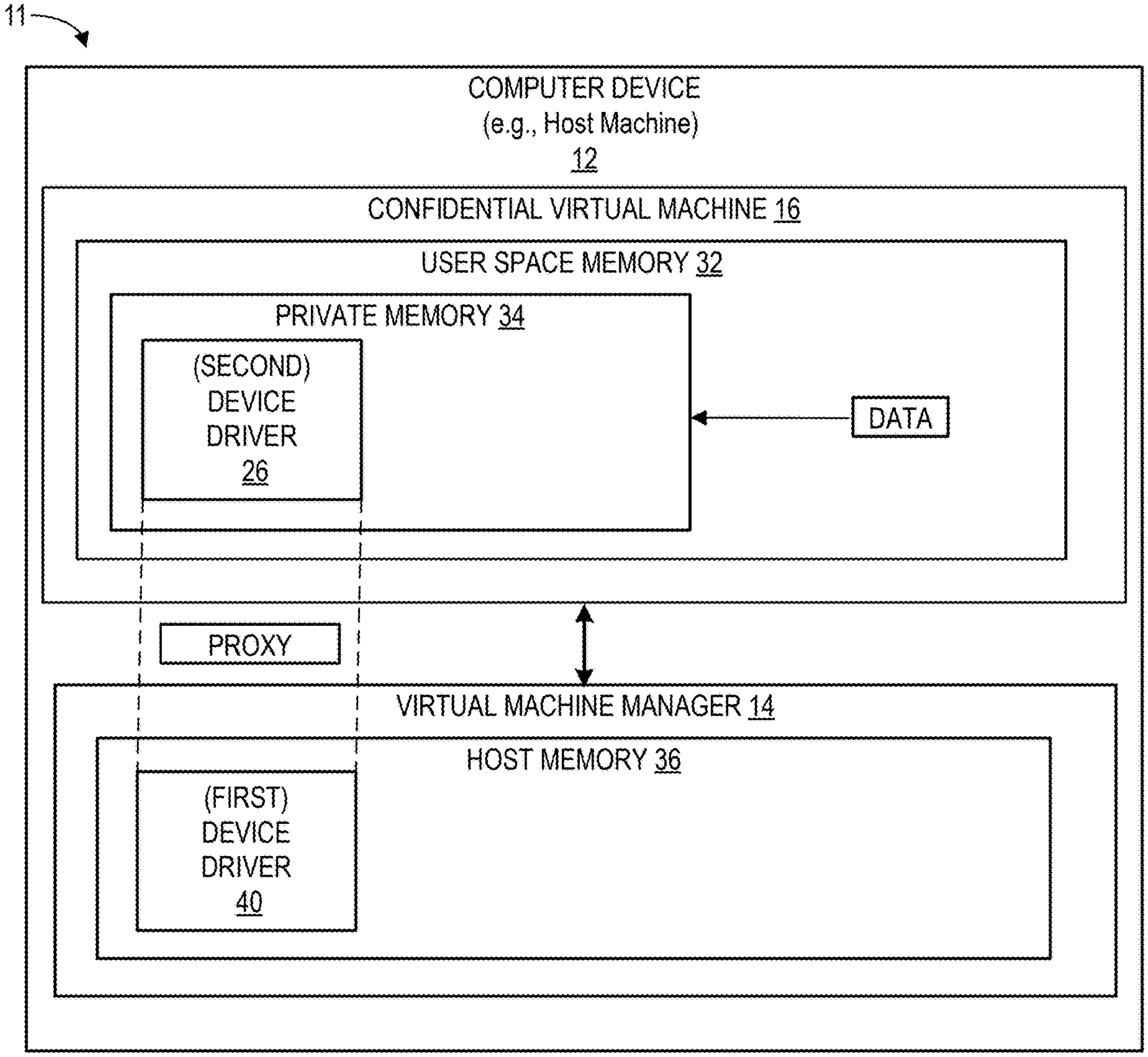
FIG. 7 is a simplified block diagram of the environment illustrated in FIG. 1 according to one implementation.

FIG. 7 is a simplified block diagram of the environment illustrated in FIG. 1 according to one implementation. The computing system 11 includes the one or more computing devices 12. The one or more computing devices 12 are to establish, by the first device driver 40 executing in the host memory 36 of the VMM 14, a communication channel with the second device driver 26 executing in the private memory 34 of the user space memory 32 of the confidential VM 16 that was initiated by the VMM 14. The private memory 34 being inaccessible by the VMM. The one or more computing devices 12 provide, by the first device driver 40, data over the communication channel to the second device driver 26 within the user space memory 32. The one or more computing devices 12 receive, by the second device driver 26, the data. The one or more computing devices 12 modify the private memory 34 to include the data or prevent the data from being written to the private memory 34, by the second device driver 26, based on a criterion.

Figure 8:
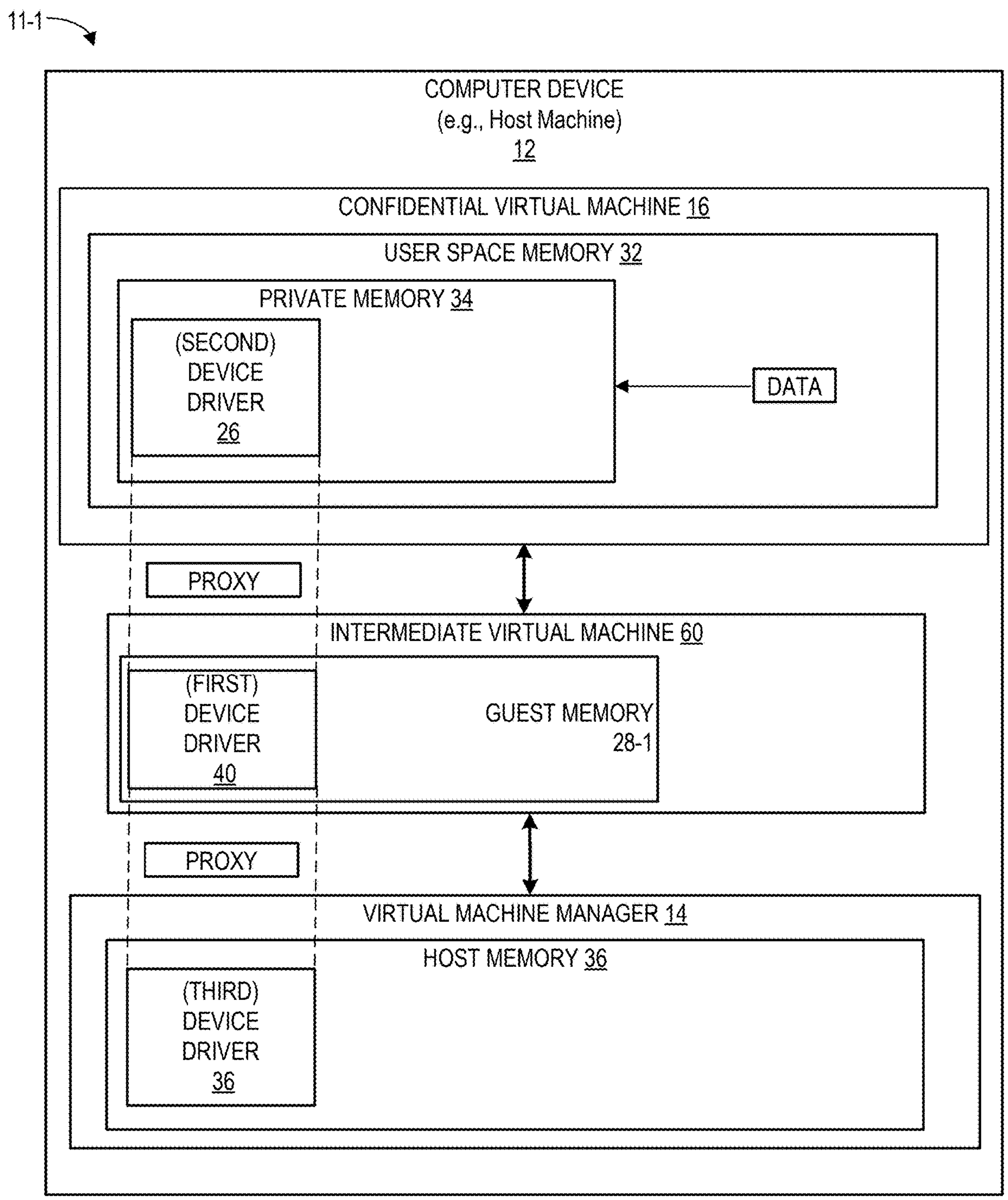
FIG. 8 is a simplified block diagram of the environment illustrated in FIG. 1 according to one implementation.

FIG. 8 is a simplified block diagram of the environment illustrated in FIG. 4 according to one implementation. The computing system 11-1 includes the one or more computing devices 12. The one or more computing devices 12 are to establish, by the first device driver 40 executing in the guest memory 28-1 of the intermediate virtual machine 60, a communication channel with the second device driver 26 executing in the private memory of a user space memory 32 of the confidential virtual machine 16 that was initiated by the intermediate virtual machine 60. The private memory 34 being inaccessible by the intermediate virtual machine 60. The one or more computing devices provide, by the first device driver 40, data over the communication channel to the second device driver 26 within the user space memory 32. The one or more computing devices receive, by the second device driver 26, the data. The one or more computing devices modify the private memory 34 to include the data or prevent the data from being written to the private memory 34, by the second device driver 26, based on a criterion.

Figure 9:
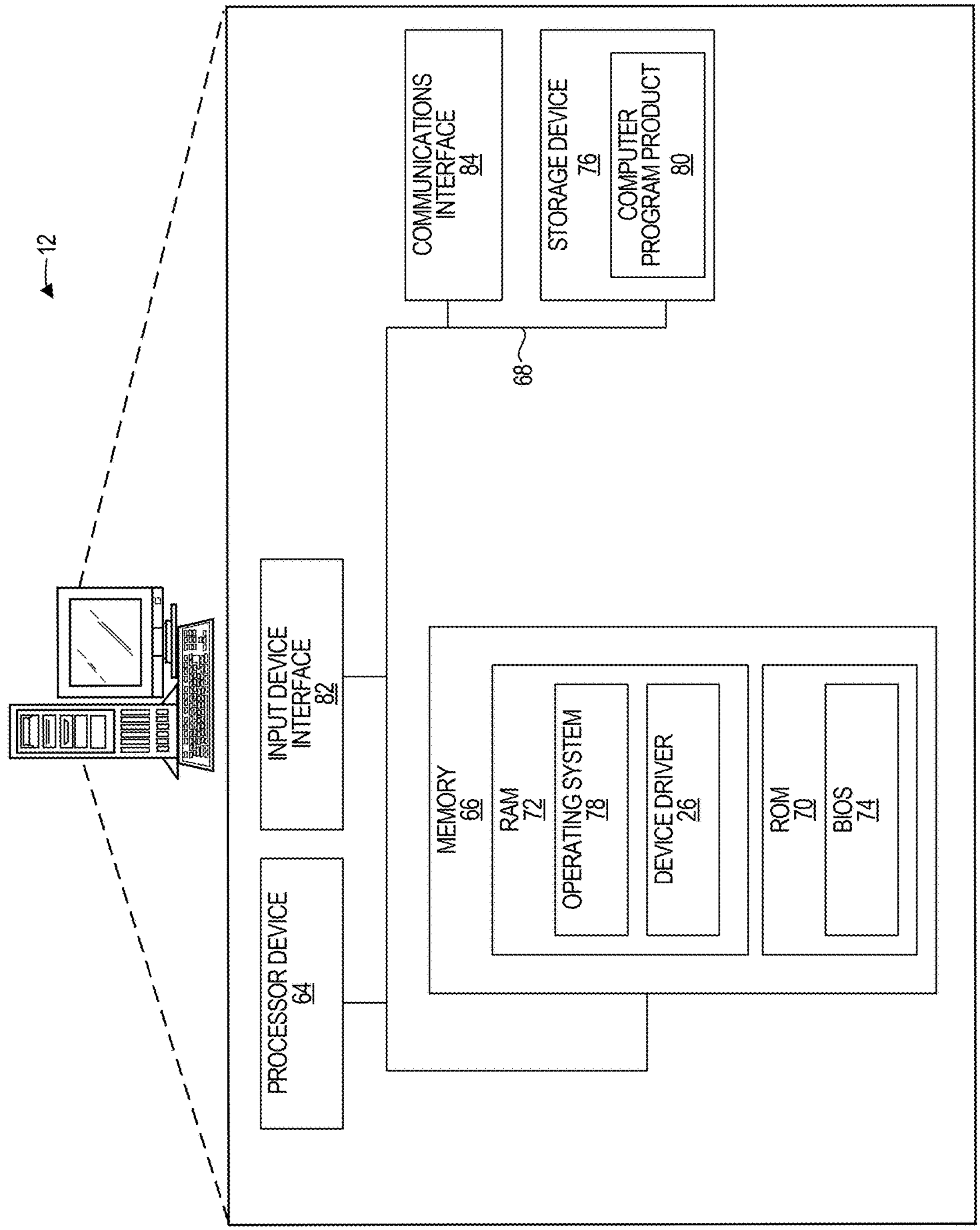
FIG. 9 is a block diagram of a computing device suitable for implementing examples according to one example.

FIG. 9 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 64, the system memory 66, and a system bus 68. The system bus 68 provides an interface for system components including, but not limited to, the system memory 66 and the processor device 64. The processor device 64 can be any commercially available or proprietary processor.

The system bus 68 may be any of several types of bus structures that may further interconnect to a memory bus (with or without a memory controller), a peripheral bus, and/or a local bus using any of a variety of commercially available bus architectures. The system memory 66 may include non-volatile memory 70 (e.g., read-only memory (ROM), erasable programmable read-only memory (EPROM), electrically erasable programmable read-only memory (EEPROM), etc.), and volatile memory 72 (e.g., random-access memory (RAM)). A basic input/output system (BIOS) 74 may be stored in the non-volatile memory 70 and can include the basic routines that help to transfer information between elements within the computing device 12. The volatile memory 72 may also include a high-speed RAM, such as static RAM, for caching data.

The computing device 12 may further include or be coupled to a non-transitory computer-readable storage medium such as the storage device 76, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 76 and other drives associated with computer-readable media and computer-usable media may provide non-volatile storage of data, data structures, computer-executable instructions, and the like.

A number of modules can be stored in the storage device 76 and in the volatile memory 72, including an operating system 78 and one or more program modules, such as the device driver 26, which may implement the functionality described herein in whole or in part. All or a portion of the examples may be implemented as a computer program product 80 stored on a transitory or non-transitory computer-usable or computer-readable storage medium, such as the storage device 76, which includes complex programming instructions, such as complex computer-readable program code, to cause the processor device 64 to carry out the steps described herein. Thus, the computer-readable program code can comprise software instructions for implementing the functionality of the examples described herein when executed on the processor device 64. The processor device 64, in conjunction with the device driver 26 in the volatile memory 72, may serve as a controller, or control system, for the computing device 12 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device 64 through an input device interface 82 that is coupled to the system bus 68 but can be connected by other interfaces such as a parallel port, an Institute of Electrical and Electronic Engineers (IEEE) 1394 serial port, a Universal Serial Bus (USB) port, an IR interface, and the like. The computing device 12 may also include the communications interface 84, such as an Ethernet transceiver and/or a Wi-Fi transceiver, or the like, suitable for communicating with the network 20 as appropriate or desired. The computing device 12 may also include a video port configured to interface with the display device, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:

establishing, by a first device driver executing in a memory of a virtual machine manager (VMM), a first communication channel with a second device driver executing in a private memory of a user space memory of a confidential virtual machine that was initiated by the VMM, wherein the private memory is inaccessible by the VMM;

providing, by the first device driver, data over the first communication channel to the second device driver within the user space memory;

receiving, by the second device driver, the data; and modifying the private memory to include the data or preventing the data from being written to the private memory, by the second device driver, based on a criterion.

2. The method of claim 1, wherein the second device driver is configured to translate operating system commands into instructions that are executable by hardware devices of the confidential virtual machine.

3. The method of claim 1, further comprising:

disabling a virtual input-output memory management unit (IOMMU) associated with the confidential virtual machine.

4. The method of claim 3, wherein disabling the virtual IOMMU comprises:

inhibiting, by the second device driver, a guest operating system executing within the confidential virtual machine from accessing the data.

5. The method of claim 1, further comprising:

storing the data in the private memory of the confidential virtual machine based on the criterion.

6. The method of claim 1, wherein the first communication channel comprises at least one of a communication subsystem or a computer bus operably connected to hardware devices of the confidential virtual machine and the VMM respectively.

7. The method of claim 1, wherein the criterion comprises configurable security parameters, the configurable security parameters defining an increase or decrease in hardware-based isolation between the confidential virtual machine and the VMM.

8. The method of claim 1, further comprising:

establishing, by a third device driver executing in a public memory of an intermediate virtual machine, a second communication channel with the second device driver.

9. The method of claim 8, further comprising:

establishing, by the third device driver executing in the public memory of the intermediate virtual machine, a third communication channel with the first device driver executing in the memory of the VMM.

10. A method of comprising: establishing, by a first device driver executing in a memory of an intermediate virtual machine, a first communication channel with a second device driver executing in a private memory of a user space memory of a confidential virtual machine that was initiated by the intermediate virtual machine, wherein the private memory is inaccessible by the intermediate virtual machine; providing, by the first device driver, data over the first communication channel to the second device driver within the user space memory; receiving, by the second device driver, the data; and modifying the private memory to include the data or preventing the data from being written to the private memory, by the second device driver, based on a first criterion.

11. The method of claim 10, further comprising:

establishing, by the first device driver, a second communication channel with a third device driver executing in a memory of a virtual machine manager (VMM).

12. The method of claim 11, further comprising:

transmitting, by the third device driver, the data over the second communication channel to the first device driver, wherein the first device driver is configured to forward the data over the first communication channel to the second device driver.

13. The method of claim 12, further comprising:

forwarding, by the first device driver, the data over the first communication channel to the second device driver based on a second criterion.

14. The method of claim 10, wherein the second device driver is configured to translate operating system commands into instructions that are executable by hardware devices of the confidential virtual machine.

15. The method of claim 10, further comprising:

disabling a virtual input-output memory management unit (IOMMU) associated with the confidential virtual machine.

16. The method of claim 15, wherein disabling the virtual IOMMU comprises:

inhibiting, by the second device driver, a guest operating system executing within the confidential virtual machine from accessing the data.

17. The method of claim 10, further comprising:

storing the data in the private memory of the confidential virtual machine based on the first criterion.

18. The method of claim 10, wherein the first communication channel comprises at least one of a communication subsystem or a computer bus operably connected to hardware devices of the confidential virtual machine and the intermediate virtual machine respectively.

19. The method of claim 10, wherein the first criterion comprises configurable security parameters, the configurable security parameters defining an increase or decrease in hardware-based isolation between the confidential virtual machine and the intermediate virtual machine.

20. A computing device, comprising:

a memory; and a processor device coupled to the memory to:

establish, by a first device driver executing in a memory of a virtual machine manager (VMM), a first communication channel with a second device driver executing in a private memory of a user space memory of a confidential virtual machine that was initiated by the VMM, wherein the private memory is inaccessible by the VMM;

provide, by the first device driver, data over the first communication channel to the second device driver within the user space memory;

receive, by the second device driver, the data; and modify the private memory to include the data or preventing the data from being written to the private memory, by the second device driver, based on a criterion.

* * * * *